United States Patent [19]
Grimsley et al.

[11] Patent Number: 5,460,124
[45] Date of Patent: Oct. 24, 1995

[54] RECEIVER FOR AN ELECTRONIC ANIMAL CONFINEMENT SYSTEM

[75] Inventors: Richard L. Grimsley, Cincinnati; Dale A. Teets, Mason; Timothy A. Coomer; Paul M. Allen, both of Cincinnati, all of Ohio

[73] Assignee: Perimeter Technologies Incorporated, Cincinnati, Ohio

[21] Appl. No.: 92,084

[22] Filed: Jul. 15, 1993

[51] Int. Cl.$^6$ .................................................. A01K 29/00
[52] U.S. Cl. .......................................... 119/721; 340/573
[58] Field of Search ................................ 119/720, 721; 340/573

[56] References Cited

U.S. PATENT DOCUMENTS

| | | |
|---|---|---|
| 2,023,950 | 12/1935 | Carter . |
| 2,131,291 | 3/1938 | Maust . |
| 2,741,224 | 4/1956 | Putnam . |
| 2,800,104 | 7/1956 | Cameron et al. . |
| 2,836,253 | 5/1958 | Lovell . |
| 2,996,043 | 6/1961 | Pettingill . |
| 3,021,391 | 2/1962 | Wagenseil et al. . |
| 3,026,508 | 3/1962 | Muller . |
| 3,051,936 | 8/1962 | Finger et al. . |
| 3,076,058 | 1/1963 | Miller . |
| 3,105,120 | 9/1963 | Hanysz . |
| 3,110,891 | 11/1963 | Herrick et al. . |
| 3,128,840 | 4/1964 | Barrett, Jr. . |
| 3,150,321 | 9/1964 | Summers . |
| 3,157,871 | 11/1964 | Umanoff . |
| 3,162,726 | 12/1964 | Rosenberg et al. . |
| 3,168,729 | 2/1965 | Volberg . |
| 3,175,047 | 3/1965 | Borberg . |
| 3,192,507 | 6/1965 | Sudges . |
| 3,472,333 | 10/1969 | Loewenstern . |
| 3,570,227 | 3/1971 | Bellinger . |
| 3,589,337 | 6/1971 | Doss . |
| 3,675,190 | 7/1972 | Auer, Jr. et al. . |
| 3,753,421 | 8/1973 | Peck . |
| 3,777,712 | 12/1973 | Gardner et al. . |
| 3,980,051 | 9/1976 | Fury . |
| 4,136,338 | 1/1979 | Antenore . |
| 4,202,293 | 5/1980 | Gonda et al. . |
| 4,208,658 | 6/1980 | Fujiki et al. . |
| 4,225,226 | 9/1980 | Davidson et al. . |
| 4,229,724 | 10/1980 | Marcus . |
| 4,242,668 | 12/1980 | Herzog . |
| 4,274,090 | 6/1981 | Cooper . |
| 4,297,684 | 10/1981 | Butter . |

(List continued on next page.)

FOREIGN PATENT DOCUMENTS

| | | |
|---|---|---|
| 2455843 | 3/1979 | France . |
| 3237927 | 4/1984 | Germany . |

OTHER PUBLICATIONS

Dogwatch, Inc. Hidden Fence Systems brochure.
"Keep Your Dog on His Home Turf," Pet Alert mailer (©1992) (two pages).
Pet Alert Owner's Manual.

*Primary Examiner*—Gene Mancene
*Assistant Examiner*—Thomas Price
*Attorney, Agent, or Firm*—Wood, Herron & Evans

[57] ABSTRACT

A system (10) for confining an animal (18) in an area (16) defined by a boundary signal. The system includes a transmitter (22; 22A) to generate the boundary signal and an emitter such as a wire (20) to define area (16). The system also includes a receiver (26; 26A; 200; 200A) to be carried on the animal's neck. The receiver includes three selectively monitored and orthogonally-positional antennas (30, 32, 34; 202, 204, 206) to avoid missing a boundary signal. The receiver further includes code-detecting, duration monitoring and/or signal-strength circuitry (270) to control giving a shock to the animal. Further, the receiver is duty-cycled to conserve battery power (56). The shock is communicated via a conductive compliant tip (532) to reduce discomfort to the animal. The transmitter includes circuitry (64) to include a code in the boundary signal, and an isolation transformer (102) to protect the transmitter from energy strikes, such as lightning, at the emitter (20).

81 Claims, 6 Drawing Sheets

U.S. PATENT DOCUMENTS

| | | |
|---|---|---|
| 4,313,216 | 1/1982 | Jaeger et al. . |
| 4,371,934 | 2/1983 | Wahl et al. . |
| 4,480,310 | 10/1984 | Alvarez . |
| 4,481,428 | 11/1984 | Charlot . |
| 4,581,769 | 4/1986 | Grimsley et al. . |
| 4,583,057 | 4/1986 | Fende . |
| 4,613,989 | 9/1986 | Fende et al. . |
| 4,631,542 | 12/1986 | Grimsley . |
| 4,634,975 | 1/1987 | Eccleston et al. . |
| 4,656,476 | 4/1987 | Tavitigian . |
| 4,686,499 | 8/1987 | Furnish . |
| 4,733,633 | 3/1988 | Yarnall, Sr. et al. ............... 340/573 |
| 4,745,882 | 5/1988 | Yarnall, Sr. et al. . |
| 4,750,215 | 6/1988 | Biggs . |
| 4,766,847 | 8/1988 | Venczel et al. ............... 340/573 |
| 4,862,175 | 8/1989 | Biggs et al. . |
| 4,954,828 | 9/1990 | Orr . |
| 4,967,695 | 11/1990 | Giunta ............... 340/573 |
| 4,996,945 | 3/1991 | Dix, Jr. . |
| 5,049,884 | 9/1991 | Jaeger et al. . |
| 5,049,885 | 9/1991 | Orr . |
| 5,053,768 | 10/1991 | Dix, Jr. . |
| 5,067,441 | 11/1991 | Weinstein ............... 340/573 |
| 5,207,179 | 5/1993 | Arthur et al. ............... 340/573 |
| 5,241,923 | 9/1993 | Janning . |
| 5,307,763 | 5/1994 | Arthur et al. ............... 340/573 |

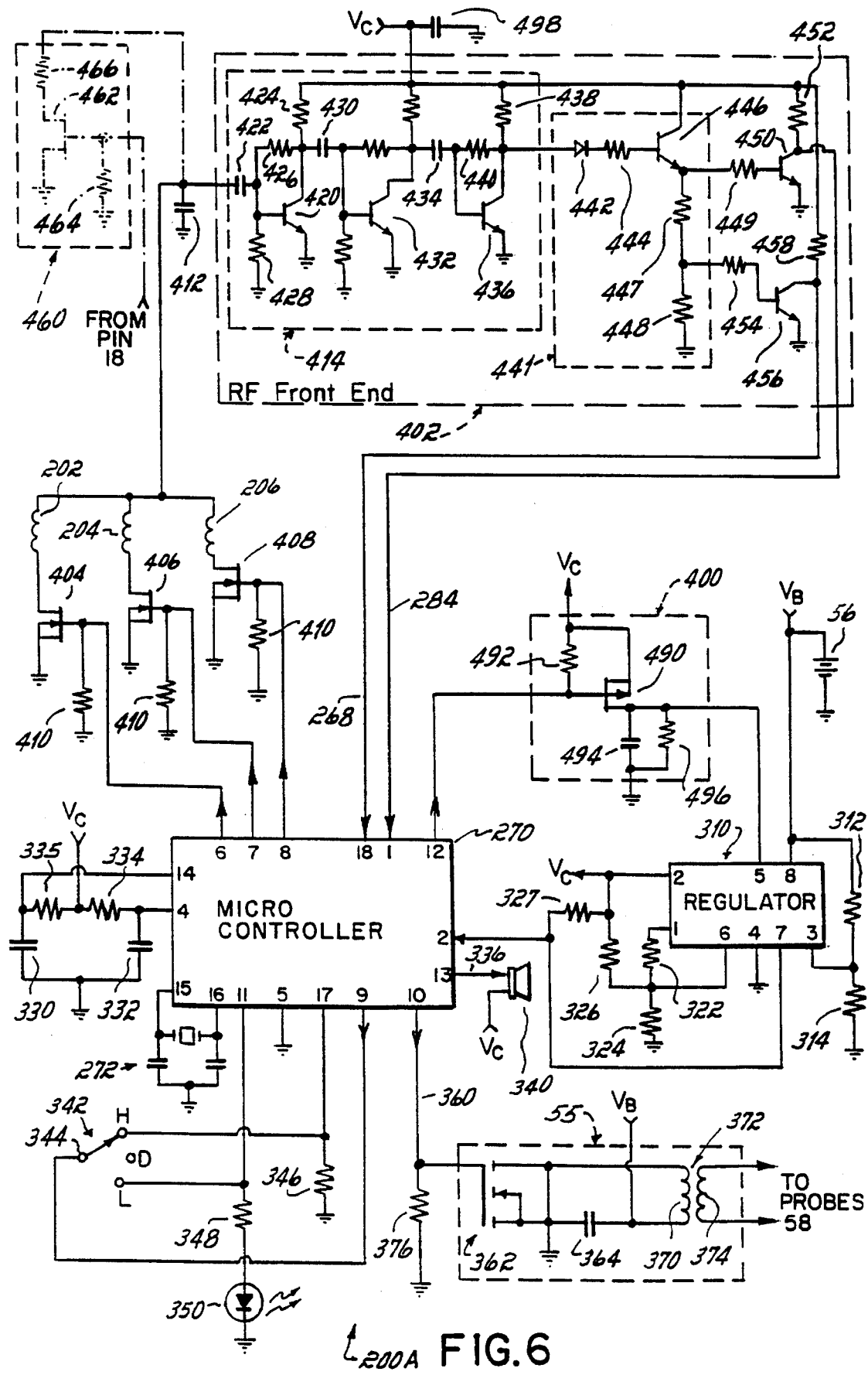

5,460,124

RECEIVER FOR AN ELECTRONIC ANIMAL CONFINEMENT SYSTEM

APPENDIX

Attached hereto as Appendix A is an object code listing of software for use with the FIG. 6 embodiment of a receiver for the present invention. The contents of Appendix A is incorporated herein by reference. Further, Appendix A contains material which is subject to copyright protection. The owner has no objection to facsimile or microfiche reproduction of the appendix as it appears in the Patent and Trademark Office patent file or records, but otherwise reserves all rights whatsoever.

BACKGROUND OF THE INVENTION

I. Field of the Invention

The present invention relates to electronic animal confinement systems and, more specifically, to such systems in which a receiver on the animal responds to an electronic signal to alert the animal to stay behind a boundary that is electronically defined by the signal.

II. Description of Prior Art

Electronic animal confinement systems have become very popular because they use electronic signals to create a boundary rather than an unsightly fence. For example, a boundary signal emitter wire is buried around the perimeter of the yard in which a pet, such as a dog, is to be confined. A transmitter hidden in the house or garage is electrically connected directly to the emitter to energize the wire with an RF boundary signal generated in the transmitter. The wire radiates the RF signal to thus electronically define an imaginary "boundary" coincident with the wire. A receiver worn about the neck of the dog and responsive to the radiated RF signal will sense or respond to the boundary signal as the dog approaches the boundary (e.g., the wire). The receiver includes circuitry designed to provide a shock to the dog to cause the dog to move away from the boundary. As a result, the dog may be kept in the yard without an unsightly fence.

Unfortunately, such systems are not without drawbacks. For example, in some situations, the receiver might not actually pick up the boundary signal as the pet approaches the boundary allowing the dog to simply "run through" the boundary. Similarly, if the dog is trapped near the boundary, repeated shocks will be administered for as long as the battery has power. Such long-term exposure to shocks is painful and deleterious to the animal. In other situations, non-boundary RF signals, such as from AC motors, electric utility cables, television sets, or the like, could be picked up by the receiver causing the dog to receive an unexpected and undesired shock even though the pet may not be near the boundary. Other problems have been experienced which further limit the utility of such animal confinement systems.

In a storm, for example, the wire acts not only as an emitter of the RF boundary signal, but may also attract energy such as from lightning. Should lightning strike at or near the wire, the transmitter circuitry may be damaged or destroyed. Also, the receiver units worn by the pet are battery-powered. It is not uncommon for the receiver to drain the battery fairly quickly. As a result, there is the risk of failure of the system to keep the pet confined due to battery failure, as well as the annoyance of frequent battery replacement to avoid such failure. An additional problem with typical receivers is that the metal lugs extending from the receiver and into the pet's neck to shock the dog are very hard and may tend to scratch or irritate the dog's neck.

SUMMARY OF THE INVENTION

The present invention provides an electronic animal confinement system, and receiver and transmitter components therefor, which overcome the above-described drawbacks of prior art systems. To this end, and in accordance with one aspect of the present invention, the receiver worn by the pet includes three orthogonally positioned antennas to insure that whenever the animal is near the boundary, the boundary signal will be detected. The circuitry within the receiver examines each one of the antennas, preferably one at a time, until the boundary signal is detected. In response to detection of the signal on any one of the antennas, the circuitry provides an annoyance signal (such as an alarm sound or a shock) to the animal to prompt the animal to back away from the boundary. In this manner, the boundary signal should not go undetected as the pet approaches the boundary, thus minimizing the likelihood that the animal might "run through" the boundary.

In accordance with another aspect of the present invention, the risk of inadvertent shocks from non-boundary RF signals is greatly reduced. To this end, the electronic boundary signal from the transmitter is encoded with a preselected signal such as by AM modulating an RF signal (e.g., 10 to 11 KHz) boundary signal with a code such as a low frequency (e.g., 10 to 1000 Hz) signal. The receiver circuitry includes a detector circuit that is responsive to the demodulated code signal and, only when that signal is found in the RF signal, is the annoyance signal provided. As a consequence, errant shocks from receipt of RF signals other than the boundary signal are minimized or eliminated.

Another feature of the present invention provides circuitry to avoid prolonged and possibly deleterious shocks to the animal. Should the animal be trapped, for example, close to the boundary, the typical receiver continues to shock the animal, possibly until the battery is drained. To avoid such a situation, in accordance with this aspect of the invention, if a shock is administered for more than a specified time, such as twenty seconds, for example, a monitor mode is commenced. In the monitor mode, shocks are suspended but the circuitry continues to monitor for the boundary signal. After the boundary signal has terminated for a period of time, indicating that the animal has been removed from the boundary, the monitor mode is terminated. Thereafter, subsequent detection of the boundary signal will result in administration of the annoyance signal once again. In this manner, prolonged and excessive administration of shocks is minimized or eliminated.

In accordance with a yet further aspect of the present invention, the battery life of the receiver is extended to reduce the annoyance of frequent battery changes or too-quickly drained receiver batteries. To this end, at least some of the power draining circuitry is duty-cycled on and off so as to reduce power usage and extend battery life. More specifically, the RF front end of the circuitry which actually detects and demodulates the received boundary signal need not necessarily be on at all times. Instead, that power-consuming circuitry is turned on for a brief interval and, if either no signal is detected or the received signal is below some minimum threshold, the RF front end will be turned off again to conserve battery power. The above-mentioned monitor mode further minimizes battery depletion as well. Still further, and to reduce the risk of a non-functional receiver due to a dead battery, circuitry is provided to monitor the battery and provide an alert when the battery is nearing the end of its useful life. The alert may be in the form of a flashing LED on the receiver housing and visible to the user to thus visibly warn the user to replace the battery well before it actually goes dead.

Microprocessor circuitry may be utilized to analyze the received signals and to control institution of the annoyance signals. In that case, the microprocessor circuitry may also be powered down when not in use and then turned back on when a signal is received to be analyzed to further conserve power. Alternatively, or additionally, the circuitry may include one or more motion sensors which allow the power-draining circuitry to be energized in response to movement of the animal such that when the animal is at rest and, therefore, not trying to cross the boundary, the battery is not wasted trying to detect a boundary signal that should not be present.

To further enhance the utility of an electronic animal confinement system, two levels of annoyance signal may be employed. As the boundary signal is first detected above the minimum threshold but below some higher threshold (indicating that the animal is nearing but not yet adjacent to the boundary) an audible tone may be given. A trained animal will often respond to the audible signal alone and retreat from the boundary thereby reducing the level of signal received by the antenna and obviating the need to shock the animal. If at any time the signal exceeds the higher threshold (as may occur if the animal is running towards the boundary, for example), the shock will be given right away and may be given along with the audible warning. On the other hand, where the signal level remains below that higher threshold, but is still above the minimum threshold, it may be assumed that the animal has not withdrawn. In such a case, the pet is to be administered a shock. To this end, the signal level is tested at brief intervals after the initial audible tone warning is given. If the signal is still present above the minimum threshold for some period of time, a shock will be administered whereas if either no signal is detected, or the signal is below the minimum threshold, the receiver will terminate the annoyance signal sequence (tone-to-shock) until a subsequent signal above the minimum threshold is received at which time the sequence will begin anew.

In situations where continued presence of the signal is the basis for a shock, the period of time between the sounding of the tone and administration of a shock may be selectively varied to accommodate animals of different temperaments, mobility, behavior, etc. Where several animals are within the same boundary, and thus have similarly tuned receivers, the delay(s) may be individualized to the specific animal by selecting different delays in the respective receivers.

In accordance with a yet further feature of the present invention, the metal shock lugs of conventional receivers are replaced with flexible or compliant conductive tips. These tips are more comfortable and thus reduce irritation to the pet, but still provide effective transfer of the shock to the pet when necessary.

With respect to the transmitter, the present invention provides lightning strike protection. To this end, and in accordance with a still further feature of the present invention, the transmitter circuit output is electrically isolated from the signal emitter (e.g., the buried wire). The isolation may be provided by an isolation transformer, for example, to thus allow the RF boundary signal to be coupled to the wire but to isolate, and protect, the transmitter circuitry from high energy strikes such as from lightning.

By virtue of the foregoing, there is thus provided an electronic animal confinement system, and receiver and transmitter components therefor, which provide advantages in performance and utility over prior art systems. These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 6 is a schematic diagram of a second microprocessor-based embodiment of a receiver in accordance with the principles of the present invention for use in the animal confinement system of FIG. 1;

DETAILED DESCRIPTION OF THE DRAWINGS

Figure 1:
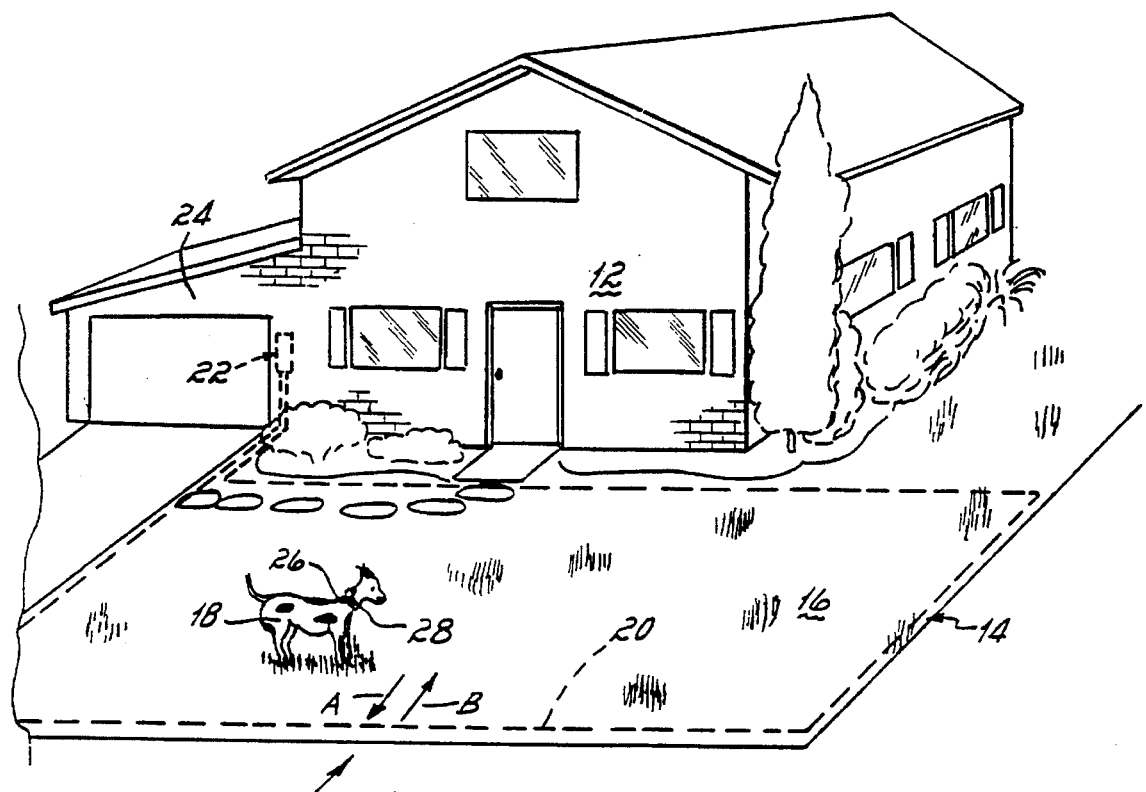
FIG. 1 is a diagrammatic view of an electronic animal confinement system in use for purposes of explaining the principles of the present invention.

With reference to FIG. 1, there is shown a diagrammatic view of an electronic animal confinement system 10 for purposes of explaining the present invention. As seen in FIG. 1, a structure such as a house 12 includes a front yard 14 in which an area 16 is to be defined as the area in which the animal, such as a pet dog 18, for example, may move about freely. To define area 16, a loop of wire represented by dashed line 20 is buried in the yard 14 to define the boundary of area 16 beyond which dog 18 is not to pass. The ends of wire 20 are electrically connected to transmitter 22 placed, for example, inside garage 24 attached to house 12. Transmitter 22 generates RF boundary signals which are radiated by buried wire 20 for reception by receiver 26 supported on dog 18 such as by collar 28 or the like.

As pet 18 approaches the boundary defined by RF boundary signals emitted from wire 20 (such as in the direction of Arrow A), the circuitry in receiver 26 begins to detect that RF signal. When the received signal reaches above some threshold limit, an annoyance signal such as an audible signal or a shock is administered by receiver 26 to pet 18 to cause pet 18 to withdraw, such as in the direction of Arrow B away from boundary 20.

As will be readily appreciated, pet 18 will not always approach boundary 20 from the same direction. Indeed, dog 18 may be running or jumping in a variety of directions such that the orientation of receiver 26 to wire 20 is not fixed but is instead quite variable. As a consequence, there may be certain positions at which receiver 26 might not be properly oriented for a single antenna in receiver 26 to receive the boundary signal. To obviate such a problem, receiver 26 is provided with a trio of orthogonally positioned antennas as will now be described with reference to FIG. 2.

Figure 2:
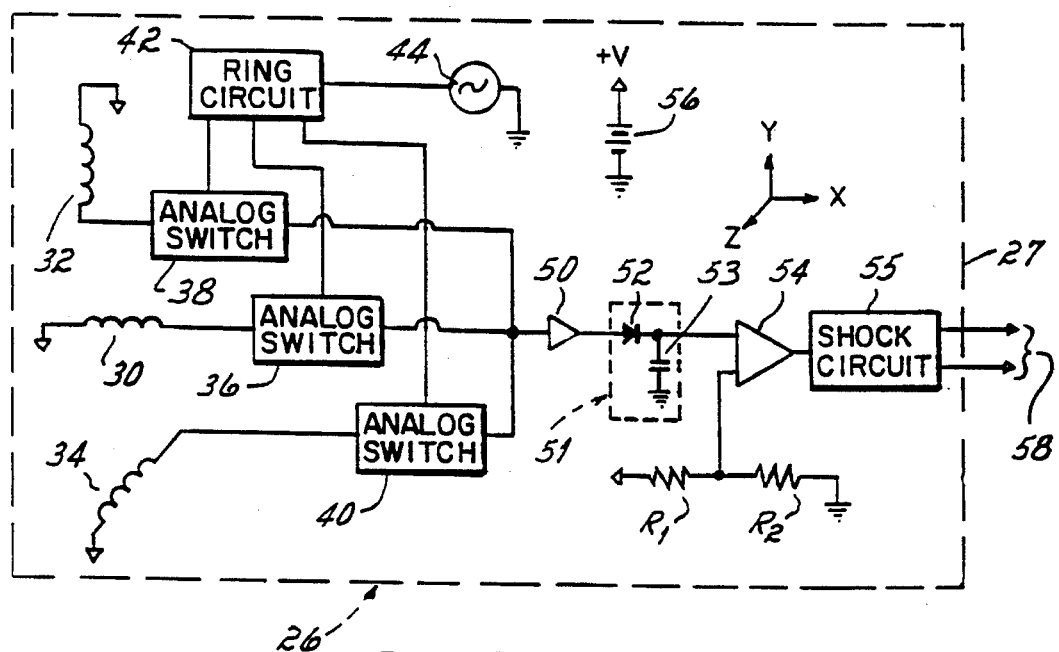
FIG. 2 is a schematic diagram of one embodiment of a receiver in accordance with the principles of the present invention for use in the animal confinement system of FIG. 1.

Turning now to FIG. 2, it will be seen that receiver 26 includes three orthogonally positioned antennas 30, 32, 34 positioned in the X,Y and Z orientations, respectively, within plastic housing 27 of receiver 26. As a consequence, as receiver 26 moves about with dog 18, at least one of antennas 30, 32 or 34 will be angled relative wire 20 so as to receive a signal thereon as animal 18 approaches the boundary. Each of the antennas is coupled through a respective analog switch 36, 38, 40 which are selectively energized one at a time by ring or counter circuit 42, which selectively enables one of three outputs in response to pulses from clock or oscillator 44. Preferably, oscillator 44 outputs a 30 Hz signal so that each switch, 36, 38, 40 is closed ten times per second, it being understood that when any one of the switches is closed, the other two are open. Thus, only one of antennas 30, 32 and 34 at a time is coupled through its respective switch to amplifier 50, which amplifies any signal received on the selected antenna to a useful level.

The output of amplifier 50 is coupled to a peak detector 51 comprised of series diode 52 and shunt capacitor 53 and then on to comparator 54 for comparison against a reference signal having a level defined by the values of resistors $R_1$ and $R_2$. The level of the reference signal is selected to correspond to the level of signal which would be received when animal 18 is deemed to be sufficiently close to boundary 20 to justify giving the shock, for example, to the animal. Accordingly, if the peak-detected output of amplifier 50 exceeds the value of the reference signal input to comparator 54, comparator 54's output will energize shock circuit 55 (which may, for example, include a multivibrator or oscillator and a step-up transformer) to generate high voltage shocks. As a result, receiver 26 provides a shock to the animal via conductive tips or probes 58 extending out of housing 27 and towards the pet's neck to thus cause animal 18 to back away from boundary 20.

Receiver 26 may be powered by a standard nine volt transistor battery 56, for example, and may include an on/off switch (not shown) as desired. Alternatively, and depending upon the requirements of the electrical circuitry employed, battery 56 may be comprised of one or more cells having a combined series voltage of 5.9 to 8.0 volts. It will be appreciated that presence of battery 56 and any transformer (not shown) in shock circuit 55 may require that one or more of antennas 30, 32, 34 actually be offset from its orthogonal axis to compensate therefor. Hence, it is to be understood that reference to the antennas as being orthogonally positioned is meant to allow for any such offset.

Figure 3:
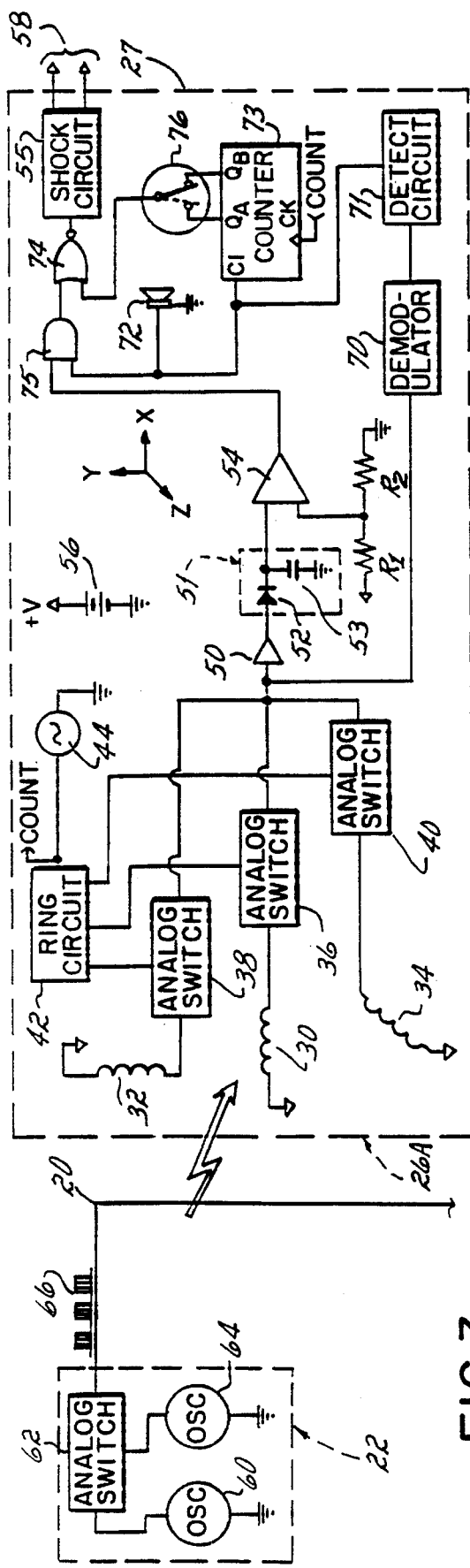
FIG. 3 is a schematic diagram of a first embodiment of a transmitter and a second embodiment of a receiver in accordance with the principles of the present invention for use in the animal confinement system of FIG. 1.

In the receiver embodiment of FIG. 2, any RF boundary signal of sufficient signal strength in the pass band of the antennas and amplifier 50 will cause a shock to be administered to pet 18. Thus, shocks may be given in response to non-boundary RF signals. In accordance with a further aspect of the present invention, such spurious and undesired shocks may be reduced or eliminated by provision of a coded boundary signal. To this end, and as seen in FIG. 3, transmitter 22 may include an RF boundary signal oscillator 60 (e.g., operating at 10 KHz), the output of which is coupled through an analog switch 62. Switch 62 is turned on and off in response to the output of low frequency (e.g. 30 or 90 Hz square wave) oscillator 64, such as to open and close switch 62 at the low frequency rate to thereby amplitude modulate the output of oscillator 60. The result is a 10 KHz RF boundary signal modulated with a 90 Hz square wave code, for example, as represented at 66. The modulated boundary signal is then coupled to wire 20 for reception by receiver 26. Although a simple low frequency square wave code is shown, it will be readily appreciated that other, more complex codes could be employed.

Receiver 26A, as also shown in FIG. 3, is like receiver 26 of FIG. 2, but further includes a demodulator such as a phase locked loop 70 and a code detect circuit 71, which is responsive to receipt by one of antennas 30, 32 or 34 of the RF boundary signal that includes thereon the code (such as the 90 Hz amplitude modulated signal) from transmitter 22. In that circumstance, where the RF boundary signal satisfies the criterion of having a valid code therein, the output of detect circuit 71 will enable an audible annoyance alert from an audible sounder such as a speaker or resonator 72. Until a valid code is detected, the output of detect circuit 71 is a logic low which clears delay counter 73 so that its outputs are all low. Upon detecting a valid code, the output of circuit 71 goes high to not only sound the alert but to also enable counter 73 to begin counting out the delay period. If the detected signal remains for a selected duration, i.e., it does not terminate before counter 73 times out (the selected Q output goes high), a signal will be output therefrom through OR gate 74 to enable shock circuit 55 to administer a shock to animal 18. Additionally, and irrespective of the delay of counter 73, if a signal is detected that indicates pet 18 is sufficiently close to boundary 20 to warrant a shock in any event, the output of comparator 54 will go high. In that event, and if a valid detect signal is indicated by circuit 71, AND gate 75 will output a logic high signal to directly enable shock circuit 55 through OR gate 74 without delay. Thus, when the received boundary signal satisfies a first criterion (e.g., the code), and also satisfies a second criterion (e.g., either duration or signal strength), a shock will be administered. In either case, because a valid code must be detected in the boundary signal, only when animal 18 approaches the boundary defined by signals emitted from wire 20 will a shock be administered rather than in response to an errant RF signal such as from an AC motor or other RF signal emitter which may be in the area.

To allow use of receiver 26 with variable tone-to-shock delays set uniquely for each animal 18 equipped with such a receiver, a selector may be provided. To this end, switch 76 has at least a first state and a second state to selectively connect the lower order $Q_A$ output or the higher order $Q_B$ output of counter 73 to OR gate 74 by which to vary the delay period, or duration, as desired by the user (not shown). Other intermediate delays may be selected by utilizing other intermediate order outputs (not shown) of counter 73 as will be readily appreciated by those skilled in the art.

Figure 4:
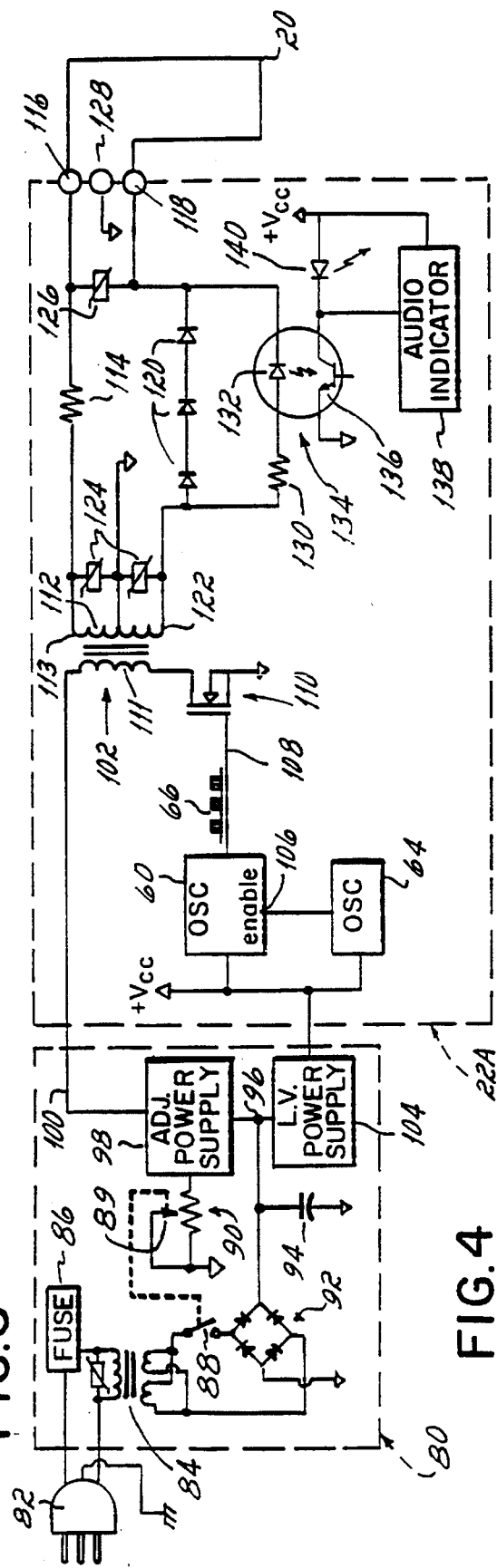
FIG. 4 is a schematic diagram of a second embodiment of a transmitter including lightning strike protection in accordance with the principles of the present invention for use in the animal confinement system of FIG. 1.

With reference to FIG. 4, there is shown a version 22A of transmitter adapted to provide coded boundary signals similar to that shown for receiver 22 in FIG. 3, but also including lightning strike protection as will be described. Transmitter 22A of FIG. 4 includes a power supply system 80 which is provided with AC power from plug 82 plugged into a wall outlet (not shown) such as in garage 24. Power from plug 82 is coupled to the primary of power transformer 84 via fuse 86. The parallel-connected dual secondaries of transformer 84 are connected through on/off switch 88, which is operable in conjunction with wiper 89 of potentiometer 90, to full wave-rectifier bridge 92. Bridge 92 is coupled to 330 µF/50 volt capacitor 94 to provide unregulated 18 volts DC at 96. The unregulated DC at 96 is coupled to a high efficiency switch mode adjustable power supply 98 (such as constructed with an MC34063 device and having a choke and thermistor in the output and compensation circuit lines) to provide 2–16 volts on output 100 to drive isolation transformer 102 as will be described. The output level from supply 98 is adjusted by varying wiper 89 of 10 kilohm potentiometer 90 to thereby adjust the strength of the RF boundary signal radiated by wire 20. By thus varying signal strength, it is possible to adjust the minimum allowable distance between wire 20 and pet 18 at which an annoyance signal is to be administered. Adjusting wiper 89 so that the voltage on output 100 decreases past its minimum will also cause switch 88 to open thereby turning transmitter 22A off. Thus, to turn transmitter 22A on, wiper 89 of potentiometer 90 is rotated to close switch 88 and begin increasing the power level output from supply 98 for use with isolation transformer 102.

The DC level at 96 is also coupled to a low voltage power supply 104 (such as a 7805 voltage regulator) to provide on its output regulated 5 volts DC to power oscillators 60 and 64. The output of oscillator 64 is coupled to the enable input 106 of oscillator 60 to thereby turn oscillator 60 on and off at a 50% duty cycle 90 Hz rate to produce on output 108 the 10 KHz modulated with 90 Hz square wave coded boundary signal as previously described (as at 66). That signal is coupled to the gate input of N-channel Mosfet 110 (type IRFZ30) which is coupled in series between isolation transformer 102 and ground to thus cause the coded boundary signal to be coupled into primary winding 111 of isolation transformer 102. The secondary winding 112 of transformer 102 is center-tapped to ground to provide a bi-polar output. At one end 113, transformer secondary winding 112 is coupled through 1 ohm/1 watt current limiting resistor 114 to terminal 116 which is coupled to one end of wire 20. The other end of wire 20 is coupled to terminal 118. Terminal 118 is coupled through three series diodes 120 (type 1N4003) to the other end 122 of secondary winding 112 of transformer 102. Ends 113 and 122 are also coupled through 33 volt metal oxide varistor transient suppressors ("MOV") 124 to the center-tapped ground. Connected in parallel across terminals 116 and 118 is a 68 volt MOV 126. A center terminal 128 may be provided for a ground connection between yard area 16 and the system ground.

Transmitter 22A is further provided with a loop-open indicator comprised of 18 ohm resistor 130 in series with the light emitting diode 132 of optoisolator 134 (type 4N26), all in parallel with the three diodes 120. Optoisolator 134 includes light sensitive NPN transistor 136 which turns on in response to light from diode 132 caused by current flowing therethrough. Current flows through diode 132 when current flow through wire 20 is degraded or interrupted such as when wire 20 is broken. When transistor 136 is thus closed, audio indicator 138 and light emitting diode 140 are energized to thereby indicate that the loop created by wire 20 and, thus, the system may be nonfunctional.

It will be appreciated that by virtue of isolation transformer 102, the coded boundary signal may be coupled to wire 20 while at the same time preventing excessive power spikes from flowing back into transmitter 22A from wire 20. Thus, in the event of a significant energy stroke on or near wire 20 such as due to lightning or the like, energy will be dissipated and not likely to be able to pass through isolation transformer 102 into the circuitry of oscillators 60 and 64, or any part of power supply 80 at a level sufficient to damage or destroy that circuitry.

Although shown as discrete components, it will be readily appreciated that the function of oscillators 60, 64 and control of indicators 138, 140 may be provided by an integrated circuit programmed device. One such device is a PIC 16C54 microcontroller available from Microchip Technology Inc. in Phoenix, Ariz.

Figure 5:
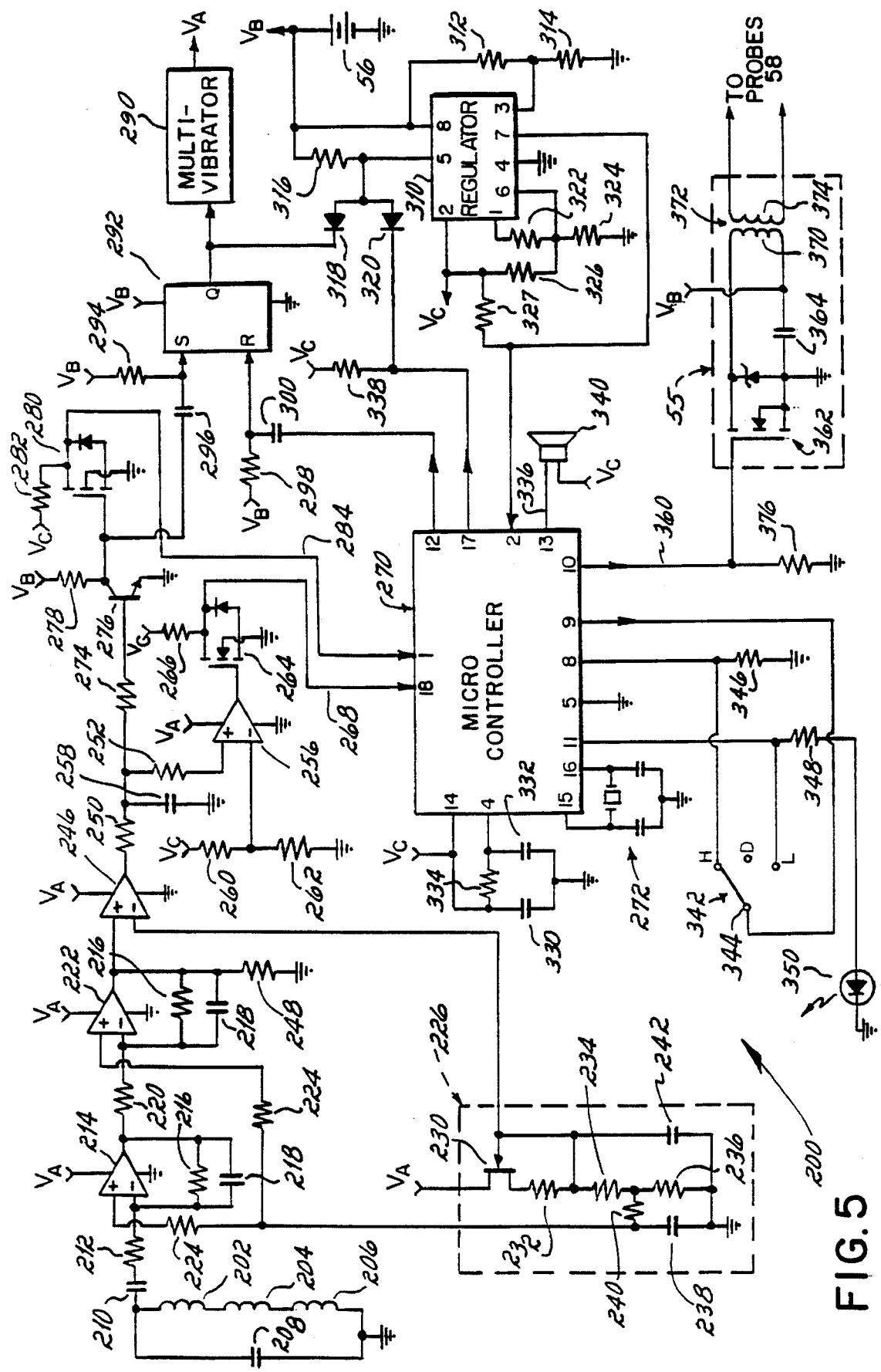
FIG. 5 is a schematic diagram of a microprocessor-based embodiment of a receiver in accordance with the principles of the present invention for use in the animal confinement system of FIG. 1.

Turning now to FIG. 5, a microprocessor-based receiver 200 is illustrated. Receiver 200 is similar to receivers 26 and 26A but provides part of the receiver circuitry as a programmed processor and includes duty-cycling circuitry to conserve power. Receiver 200 includes three orthogonally positioned 10 millihenry inductor antenna coils 202, 204, 206, however, in this case they are connected in series so that energy received by any of them may be detected at all times. Coupled in parallel across the series antennas is 7500 pF capacitor 208. The output of the antennas is coupled through 0.01 µF capacitor 210 and 22 Kohm resistor 212 to the inverting input of amplifier 214 which includes a parallel 330 Kohm resistor 216 and 22 pf capacitor 218 feedback network to provide a low pass pole at about 15 KHz. Amplifier 214 is coupled through 22 Kohm resistor 220 to the inverting input of second amplifier 222 which similarly includes a parallel resistor/capacitor feedback network to provide a low pass pole at about 15 KHz. The non-inverting inputs of amplifiers 14 and 222 are coupled through respective 22 Kohm resistors 224 to bias circuit 226. Bias circuit 226 includes an N-channel FET 230 (type MMBFJ309LT1) the channel of which is connected between a selectively controlled source of power $V_A$, and the series combination of 1 megohm resistor 232, 16 kilohm resistor 234 and 100 kilohm resistor 236 to ground. Resistors 224 are coupled to ground through 0.01 µF capacitor 238 and to the junction of resistors 234 and 236, via 10 Kohm resistor 240. The junction of resistors 232 and 234 is coupled to the gate of transistor 230, to ground through 100 pF capacitor 242 and to the inverting input of third amplifier 246, the non-inverting input of which is coupled to the output of amplifier 222 and to ground through 1 megohm resistor 248.

The output of amplifier 246 is coupled through 100 Kohm resistor 250 and 1 megohm resistor 252 to the non-inverting input of fourth amplifier 256. The junction of resistors 250 and 252 is coupled to ground through 0.01 µF capacitor 258. The inverting input of amplifier 256 is biased to a preselected reference level by 2.2 megohm resistor 260 and 560 Kohm resistor 262 between a source of power $V_c$ and ground. The output of amplifier 256 drives an N-channel Mosfet 264 (type 2N7002), the channel of which is coupled between ground and, through 1 megohm resistor 266, to power supply $V_c$. The junction of transistor 264 and resistor 266 is a digital output that is normally at a high logic level (a "1") equal to approximately $V_c$ and is driven low (a "0") to ground whenever a signal is received through RF front end amplifiers 214, 222, 246 and 256 from antennas 202, 204 and 206 of sufficient strength to be indicative that pet 18 is so near wire or other RF emitter source 20 such that an immediate shock may be needed to divert pet 18 away from the boundary. The output of transistor 264 is a "near-boundary" signal and is coupled over line 268 to one of the data lines (e.g., pin 18) of microprocessor 270 (such as the aforementioned PIC 16C54 Microcontroller) for utilization by the microprocessor as will be described hereinafter. Processor 270 includes a 32.786 KHz crystal clock 272.

The output of third amplifier 246 is also coupled through resistor 250 and 100 Kohm resistor 274 to the base of NPN transistor 276, the emitter of which is grounded and the collector of which is coupled through 1 megohm resistor 278 to the positive terminal of battery 56 (designated as $V_B$). The collector of transistor 276 (type MBT2222) is also coupled to the gate input of Mosfet transistor 280 (type 2N7002), the channel of which is between ground and, via 1 megohm resistor 282, source of supply $V_c$. The output from transistor 280 is normally logic "1" (at or near $V_c$). In response to RF energy at an appropriate level from amplifiers 214, 222 and 246, the circuitry previously-described demodulates the RF or high frequency therefrom. The resultant signal is a low frequency signal, if any were modulated on the received RF signal, which is alternating between a logic low and a logic high on line 284 corresponding to the low frequency modulation on any RF signal detected by antennas 202, 204, 206. That low frequency signal, the "code-detect" signal, is coupled via line 284 into a data line (e.g., pin 1) of microcontroller 270 for examination. That signal could also or alternatively be provided to the real time clock count pin (pin 3). The signal thus received is examined by processor 270 to determine if it corresponds to the anticipated low frequency or "code" expected. If so, then microcontroller 270 will utilize that information to control generation of an audible tone and/or shock to pet 18 as will be described.

In order to conserve battery life, the active portion of the RF front end (amplifiers 214, 222, 246 and 256) is intermittently energized. To this end, each of the amplifiers is selectively powered from a source of supply $V_A$, which is provided by the output of multivibrator circuit 290. The output is a 10% duty cycle pulse which is on for 30 milliseconds and off for 300 milliseconds, for example, to thus interrogate for energy from antennas 202, 204, and 206 approximately 3 times per second. Circuit 290 is powered by $V_B$, i.e. from battery 56, and thus is operating at all times that battery 56 has sufficient charge. Duty cycle circuit 290 can also be forced to output a steady "on" voltage on its output $V_A$ in response to flip-flop 292. Normally, the output of flip-flop 292 is at a logic level ("1") that allows circuit 290 to operate in a free-wheeling mode to thus pulse the RF front end on and off. In response to a signal on the S input of flip-flop 292, the output thereof will change logic states to a low ("0") causing circuit 290 to force a logic high output on the $V_A$ output to thus turn amplifiers 214, 222, 246 and 256 full on until flip-flop 292 is reset by a signal on the R input thereof. Ordinarily, the S input of flip-flop 292 is tied to a logic high through 330 kilohm resistor 294 to $V_B$, however in response to receipt of a signal of sufficient strength at transistor 276, a negative going pulse is coupled through 0.001 µF capacitor 296 to cause the output of flip-flop 292 to change states and thus control circuit 290 to turn the RF front end full on. The R input of flip-flop 292 is also similarly tied to a logic high through 100 Kohm resistor 298 to $V_B$, but when a low-going "reset" signal on a selected dataline from microcontroller 270 (e.g., from pin 12) is output therefrom, it causes a negative going pulse to pass through 0.01 µF capacitor 300, thereby resetting flip-flop 292 to once again allow circuit 290 to produce its periodic pulses.

Receiver 200 also includes a 3.1-volt regulator 310 such as a programmable low-dropout voltage regulator, type MAX667CSA, available from Maxim Integrated Products in Santa Clara, Calif. Regulator 310 is powered on its input terminal (pin 8) by $V_B$. A "low battery" test input is also provided (pin 3) which is coupled to the junction of 1 megohm resistor 312 and 270 Kohm resistor 314 in series between $V_B$ and ground. The shutdown input of regulator 310 (pin 5) is tied to $V_B$ through 1 megohm resistor 316 to turn off (shut-down) regulator 310 unless that input is pulled low. In this regard, the shutdown input is be pulled to a logic low either through diode 318 (by the output of flip-flop 292 when it receives the negative-going pulse on its S input indicative that a near-boundary signal may have been detected such that processor 270 should stay powered up) or through diode 320 by a low state signal from pin 17 of processor 270 (referred to hereinafter as the "keep alive" signal) which is utilized to maintain power to processor 270 in either low power standby or monitor modes as will be described. Diodes 318 and 320 may be a dual diode package (type MBAW56L). The DD input (pin 1) of regulator 310 is coupled to ground through 1 megohm resistor 322 and 330 Kohm resistor 324, and the set input (pin 6) is coupled to ground directly through resistor 324 and coupled to the 3-volt DC output (pin 2) through 1 megohm resistor 326. That output is $V_c$. The low battery output line (pin 7) is pulled to a logic level high of $V_c$ through 1 megohm resistor 327, and coupled to one of the datalines (pin 2) of microcontroller 270 such that when the battery level falls below a predetermined value, a low battery signal is provided from regulator 310 to microcontroller 270 to cause processor 270 to go into the standby low power mode to be described.

Microcontroller 270 is powered (pin 14) from the $V_c$ output of regulator 310, and also has a master clear function (pin 4), such that each time regulator 310 is enabled to produce $V_c$ µF/6 volt capacitors 330 and 332 and 47 Kohm resistor 334 cooperate to provide a temporary master clear signal to microcontroller 270 to reinitiate the processing sequences thereof. Once the master clear function is completed, microcontroller 270 begins monitoring for a signal ("near-boundary") on line 268 and a signal ("code-detect") on line 284 as will now be described.

Normally, only transistor 276, flip-flop 292, and circuit 290 are energized at all times (by $V_B$) with the output of flip-flop 292 at a logic high. Thus, the shutdown input of regulator 310 is pulled high and $V_c$ is at a low level insufficient to power processor 270, for example. Accordingly, processor 270 is powered down as are transistor switches 264 and 280. Once every one-third second or so, $V_A$ will go high for 30 milliseconds enabling the RF front-end amplifiers to detect RF energy on antennas 202, 204, 206. If insufficient signal is present, transistor 276 will remain biased off and $V_A$ will be discontinued. The sequence of turning the amplifiers on and off will continue until a signal of sufficient strength is received to bias transistor 276 on. A signal will then be coupled to the S input of flip-flop 292 as a result of which several things will happen. Circuit 290 will turn the RF front end full on and the shutdown input of regulator 310 will be pulled low through diode 318 causing the supply $V_c$ to be provided. Processor 270 will then be powered up (and reset via the master clear) and transistor switches 264 and 280 will be energized to produce boundary and detect signals if appropriate.

If the received RF signal includes a valid code, as determined by processor 270 upon examination of the code-detect signal on line 284 from amplifier 280, processor 270 which will then initiate an audible annoyance signal to pet 18. To this end, a speaker enable signal is provided on line 336 (from pin 13) to energize piezoelectric resonator 340 in an attempt to cause pet 18 to move away from the source of the RF. Also, depending upon the state of switch 342 and whether the near-boundary signal is also being provided, a shock will be administered. Thus, if a valid detect signal is present and the RF signal is sufficiently strong to cause amplifier 264 to output a near-boundary signal, then animal 18 is assumed to be too close to boundary 20 and a shock must be administered immediately. If, however, there is no boundary signal, then whether a shock is administered immediately or after a period of time if a valid detect signal continues to be present after that period of time is dependent upon the setting of control switch 342.

To determine when and whether to administer a shock, processor 270 responds to the state of selector switch 342 as determined upon each power-up of processor 270 as follows. Upon being powered-up (after the master clear), microcontroller 270 outputs an interrogation signal on one of its data lines (pin 9) to the common terminal 344 of switch 342 and monitors two other data lines (pins 8 and 11 ) for presence of that signal. Those lines are coupled to the high (H) and low (L) poles of switch 342 and are normally tied to a logic low through 1 megohm resistor 346 or the series combination of 1 megohm resistor 348 and LED 350, respectively. The interrogation signal is normally only approximately 200 milliseconds in length so that if switch 342 is in the low or "L" position, there will be insufficient energy coupled through 330 ohm resistor 348 and light emitting diode 350 to cause same to be visually noticeable.

If switch 342 is in the high or "H" position, when interrogated, pin 8 will receive a high signal and pin 11 will receive a low signal. By contrast, if switch 342 is in the Low or "L" position, when interrogated pin 8 will receive a low signal and pin 11 will receive a high signal. If switch 342 is in the middle "delay" or "D" position, both pins 8 and 11 will be low when they are examined upon interrogation of the signal from pin 9. The logic state received by microcontroller 270 at pins 8 and 11 is used as follows.

If switch 342 is in the H position, a strong shock is to be produced immediately upon validating the code-detect signal, just as if the near-boundary signal had also been present. If switch 342 is in the L position, the shock will still be immediate but at a lower, more moderate level. Finally, if switch 342 is in the D position, the shock will be delayed for one (1) second and if, during that one (1) second interval, the code-detect signal remains valid, a strong intensity shock will then be given. The delay in giving the shock allows pet 18 to move away from the boundary without receiving a shock. Of course, should a near-boundary signal appear during that one second interval, a shock will then be immediately administered even though the delay period has not expired. If, however, during that one second interval, pet 18 moves away from the boundary, the signals from the various amplifiers in the RF front end will decrease until they are too low to be detected, at which point, microcontroller 270 will determine that signals are no longer present. No shock will thus be administered. Instead, a reset signal (from pin 12) will be coupled to flip-flop 292 causing same to reset, whereafter circuit 290 will begin once again pulsing the RF front end on and off. Additionally, regulator 310 will again be shut down and processor 270 powered down.

By virtue of switch 342, each receiver 200 may be set specific to each animal 18 wearing the receiver so that each animal in the area may be given different delay periods and/or differing levels of shock as appropriate. The shock, once initiated, will continue until pet 18 withdraws from the region of boundary 20 or a sufficient time period passes after which it is assumed that further shocks will be futile. The latter situation will be discussed in connection with the "keep alive" signal below. In the former situation, while microcontroller 270 is powered up, lines 268 and 284 are monitored for the presence of near-boundary and code-detect signals. If pet 18 moves away from the boundary, the signals from the various amplifiers in the RF front end will decrease until they are too low to be detected, at which point, microcontroller 270 will determine that signals are no longer present. At that point, processor 270 will terminate administration of shocks and will output the reset signal to the R input of flip-flop 292 causing circuit 290 to again go into the duty-cycle mode. As a consequence, the RF front end will again be powered on and off intermittently and processor 270 will be powered down until an RF signal of sufficient strength is once again detected.

To produce a shock, a low frequency "zap" signal is produced from processor 270 (e.g., from pin 10) and is coupled over line 360 to drive N-channel Mosfet transistor 362 (type MTD3055E1) of shock circuit 55 to turn same on and off. By turning transistor 362 on and off, energy is selectively coupled from battery 56 through 470 µF/16 volt capacitor 364 to the primary coil 370 of step-up transformer 372 designed to accept a 7.5 volt pulse and output at least a 3500 volt pulse (such as Part No. GTX 01-11539-2 available from Coil Tronics, Inc. in Pompano Beach, Fla.), the output coil 374 of which is coupled to probes 58 to initiate a high voltage shock to pet 18. The input or gate of transistor 362 is normally tied to a logic low through 1 megohm resistor 376 to insure that a shock is not generated unless a "zap" signal is actually generated by microcontroller 270. In the H and D positions of switch 342, the "zap" signal will be comprised of a continuous series of 500 µS pulses with 3 ms off-time between pulses to provide a strong shock. In the L position of switch 342, the "zap" signal will be a continuous series of 350 µS pulses with 3 ms off-time between pulses to effectively provide a lower level of shock to pet 18.

In training the pet, the H or L position would typically be used depending upon the size of the pet. The D position may be selected later when there is confidence that sound alone will likely cause pet 18 to move away from boundary 20 without normally requiring a shock.

If a significant period of time passes, such as twenty seconds, and the signal is still strong enough that a shock is still being given, then little more should be attempted to deter animal 18. In this event, processor 270 goes into a low power monitor mode to conserve energy and stop shocking animal 18. In the monitor mode, the zap signal is not given. Instead, the reset signal is given so that the RF front end is again duty-cycled on and off, but a low logic level keep alive signal is also given. Normally, diode 320 is biased off by 100 Kohm pull-up resistor 338. The keep alive signal is coupled through diode 320 to cause regulator 310 to continue to output $V_c$ and thus maintain processor 270 powered up so that its memory contents are not lost. But in the monitor mode, processor 270 merely monitors for the code-detect signal to determine if it terminates for a period of time, e.g., 4 seconds. Unless the code-detect signal is absent for the full time required, processor 270 remains in the low-power state with the keep alive signal maintained (and no zap signal generated). If the code-detect signal is absent for a full 4 seconds, the keep alive signal is terminated allowing regulator 310 to shut down and power down processor 270. Normal operation as previously described will then ensue. But by being in the low-power monitor mode, continued detection of near-boundary and code-detect signals will not cause a zap signal thus preventing harm to pet 18 and conserving battery power. A low-power standby mode may also be entered if a low battery signal is received from regulator 310 (such as at pin 2 of processor 270). In that case, an intermittent signal (e.g., a 50 ms pulse) will be provided from processor 270 (on pin 9) sufficient to flash LED 350 on and off. LED 350 is mounted to be visible from the exterior of housing 27 so that the pet's owner will have a visible warning that the battery needs to be changed. Additionally, and unlike the monitor mode of low power operation when a shock has been administered for a long period of time, the low-battery standby mode operates to provide normal functionality to the receiver, but in a power conservation mode. To this end, the processor goes into a "sleep" mode during which its power consumption is very low. An internal watchdog timer (not shown) begins to time out and, when it does, processor 270 "wakes up." Upon waking up, processor 270 examines the code-detect and near-boundary signal lines for valid signals and also outputs a signal to flash the LED on and off. If no valid signal is present, processor 270 again goes into the sleep mode to await the next time out of the watchdog timer. But, if a valid code-detect signal is present, then operation will be as previously described for full power operation with respect to the administration of annoyance signals and the like.

Figure 6A:
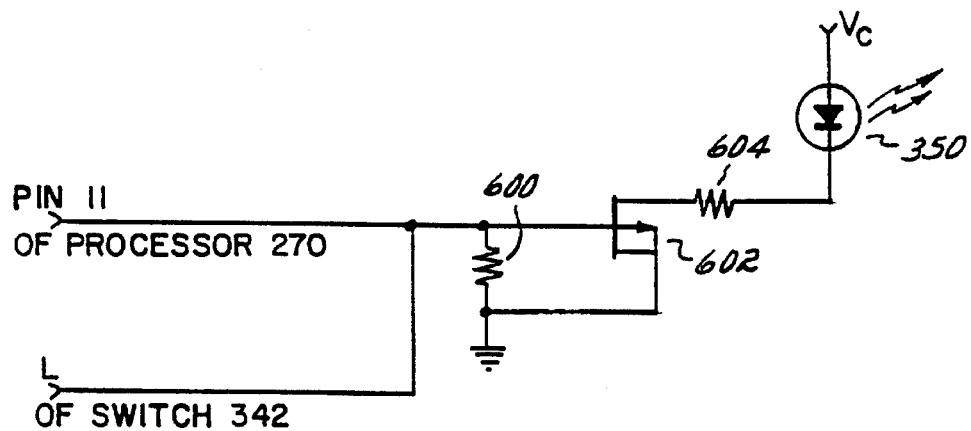
FIGS. 6A–C are schematic drawings of modifications to parts of the circuit of FIG. 6.
Figure 6B:
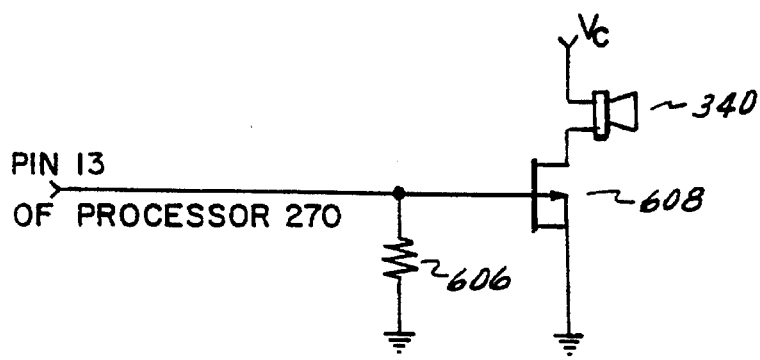

A second embodiment of a microprocessor-based receiver 200A is illustrated in FIG. 6. Operation of receiver 200A is similar to receiver 200, except that the three orthogonally positioned antennas 202, 204, and 206 are, once again, sampled and control of the power duty-cycling is simplified. To this end, regulator 310 and power cycle or timer circuit 400 cooperate to duty cycle the circuitry of receiver 200A on and off. More specifically, the shutdown input (pin 5) of regulator 310 is no longer tied high, but is instead controlled through power cycle circuit 400 which is responsive to the shutdown signal from processor 270 to turn off for about ⅓ second and then turn back on. While regulator 310 is off, the RF front end 402 and microprocessor 270 are powered down to conserve battery power. After the ⅓ second, circuit 400 times out allowing regulator 310 to turn back on and supply $V_c$ to power RF front end 402 and processor 270.

When processor 270 first powers up, it goes through a master clear and determines the state of switch 342, all as previously described (with modifications to the RC circuit coupled to pins 4 and 14 as shown in FIG. 6 including the addition of 56 ohm resistor 335). Processor 270 then begins to examine the antennas. To this end, processor 270 outputs a signal on one of its data lines (e.g., pin 6) to turn on analog switch 404 for about 11–12 ms. When switch 404 is on, RF energy on antenna 202 may be detected as will be described. If no signal is detected, analog switch 404 is turned off and processor 270 will output a second 11–12 ms signal on another data line (e.g., pin 7) to turn on second analog switch 406 coupled to second antenna 204 to thereby monitor for energy therefrom. Here again, if no signal is detected, then switch 406 is turned off and a third 11–12 ms signal from another data line (e.g., pin 8) is output from processor 270 to turn on third analog switch 408 to detect RF energy from third antenna 206. Each of switches 404, 406 and 408 are normally held in the off state by a respective 1 megohm ("Mohm") resistor 410 coupled between the gate thereof and ground. If no signal is detected from any of the three antennas, the shutdown signal is issued to power cycle circuit 400 to turn off regulator 310 for ⅓ second and power down receiver 200A.

Whenever one of antennas 202, 204 and 206 is selected (by turning on its associated switch 404, 406, and 408), energy therefrom resonates with parallel 0.022 µF capacitor 412. If RF energy is present on the selected antenna to resonate with capacitor 412, the signal is coupled to amplifier 414 of RF front end 402. More specifically, the signal is coupled to the base of grounded emitter NPN transistor 420 via 4700 pF capacitor 422. The collector of transistor 420 is coupled to $V_c$ via 100 Kohm resistor 424 and is also coupled for negative feedback to its base via 2.2 Mohm resistor 426. The base thereof is further coupled to ground via 820 Kohm resistor 428. The amplified signal from transistor 420 is coupled via 1000 pF capacitor 430 to the base of second grounded emitter NPN transistor 432 which is similarly biased by a second set of resistors 424, 426 and 428. The output of transistor 432 is coupled via 470 pF capacitor 434 to the base of third grounded emitter NPN transistor 436, the collector of which is coupled via 330 Kohm resistor 438 to $V_c$ and employs a 3.3 Mohm negative feedback resistor 440.

The output of amplifier 414 is coupled to detector 441 comprised of the series circuit of diode 442 and 68 Kohm resistor 444 coupled to the base of NPN emitter follower transistor 446. The collector of transistor 446 is tied to $V_c$ and the emitter thereof is coupled to ground via 430 Kohm resistor 447 and 560 Kohm resistor 448 to provide at the emitter a signal corresponding to the modulation on any received RF signal. The demodulated signal is coupled via 100 Kohm resistor 449 from the emitter of transistor 446 to the base of grounded emitter NPN transistor switch 450 to provide a micro-processor compatible digital signal corresponding to the modulation in the received RF signal. The collector of switch 450 is coupled to $V_c$ via 1.0 Mohm resistor 452 and to pin 1 of processor 270 to provide the code-detect signal utilized by processor 270 to determine whether to administer an annoyance signal. An attenuated demodulated signal is present at the junction of resistors 447 and 448. If the attenuated signal is of sufficient strength, then a near-boundary signal is to be given to cause immediate administration of a shock (provided a valid code-detect signal is also present). To this end, the attenuated signal is coupled via 1.0 Kohm resistor 454 to the base of grounded emitter NPN transistor switch 456 to similarly provide a digital signal for utilization by processor 270. The collector of transistor 456 is coupled to $V_c$ through 2.2 Mohm resistor 458 and to pin 18 of processor 270 to provide the digital near-boundary signal.

The output from transistor 450 is coupled to processor 270 as the code-detect signal previously described in connection with receiver 200 for evaluation. If the code-detect signal is the proper 90 Hz coded signal, for example, then an annoyance signal, such as a sound and/or shock is administered. An audible annoyance signal will be generated in any event as previously described. And a shock annoyance signal is also given in accordance with either the state of switch 342 or presence of the near-boundary signal as also previously described.

As an alternative to the use of switch 456, a different test for attenuated RF signals could be undertaken. In this case, if switch 342 indicates a possible delay may be incurred (i.e., switch 342 is in the D position), upon detecting a valid code-detect signal, processor 270 could output a signal (such as from pin 18) to an attenuator circuit 460 (shown in phantom in FIG. 6) which reduces the signal level received into amplifier 414. Transistor 462 of circuit 460 is normally biased off by pull-down resistor 464 but in response to the signal from processor 270 turns on to sink current from the input of amplifier 414 through resistor 466 and transistor 462 to thus attenuate the signal to amplifier 414. The code-detect signal is then evaluated based upon the attenuated signal. If the code-detect signal is still valid, even though the RF signal has been attenuated, then it may be assumed that pet 18 is sufficiently close to the boundary to warrant a shock. Accordingly, a zap signal will be generated to shock the animal just as if the near-boundary signal had been provided by switch 456. However, if the code-detect signal is not able to be validated when the RF signal is attenuated, then it is assumed that the pet is near enough to the boundary to warrant an audible annoyance signal, but no so close as to be in immediate danger of crossing through the boundary. Thus, a shock is not immediately necessary and none is given unless the other requirements are met as described in connection with receiver 200 or the attenuated signal raises to a level sufficient to provide a validated code-detect signal.

In the event a valid code-detect signal is present, the switch 404, 406, 408 which was turned on is held on for continued processing of signals from the associated antenna 202, 204 or 206.

Power circuit 400 is provided for purposes of duty-cycling RF front end 402 and processor 270. Power circuit 400 includes Mosfet switch 490 the input or gate of which is normally tied to $V_c$ via 1 Mohm pull up resistor 492 to $V_c$ and also coupled to pin 12 of processor 270 to receive a digital low "shutdown" signal when regulator 310 is to shutdown. The source of switch 490 is also coupled to $V_c$ with the drain coupled to the shutdown input of regulator 310 and to RC timer circuit comprised of 0.1 µF capacitor 494 in parallel with 3.3 Mohm resistor 496 coupled to ground. When regulator 310 is on, and processor 270 is not outputting the shutdown signal, switch 490 is turned off such that the shutdown input of regulator 310 is pulled via the RC circuit to a logic low thus maintaining regulator 310 powered up to output $V_c$. Upon receipt of a shutdown signal from processor 270 to activate timer 400, switch 490 closes allowing capacitor 494 to charge up at a rate determined by the RC time constant until the shutdown input of regulator 310 sees a logic high level and thus shuts off power to RF front end 402 and processor 270. As a result, the shutdown signal will terminate and switch 490 will not be powered. Regulator 310 will be held off for the time it takes capacitor 494 to discharge to a logic low level (about ⅓ second) to again cause regulator 310 to power up and output $V_c$ to turn RF front end 402 and processor 270 back on as previously described.

While particular examples of operation of processor 270 are described herein, other techniques could be employed. A listing of the object code for programming processor 270 to operate as described in connection with FIG. 6 is set forth in Appendix A included herewith and incorporated herein by reference.

The resistor components that are common to receivers 200 and 200A are of slightly different values as set forth in the following table:

| Resistor Component | Value in Receiver 200A |
|---|---|
| Resistor 312 | 8.2 Mohm |
| Resistor 314 | 2.2 Mohm |
| Resistor 324 | 1.0 Mohm |
| Resistor 326 | 1.5 Mohm |
| Resistor 348 | 130 ohm |

A 0.1 µF decoupling capacitor 498 is provided between $V_c$ and ground. Also, the base of each transistor 450, 456 may be coupled to ground with a respective 0.01 µF capacitor (both not shown) to reduce noise and high frequency signals that might hamper operation of processor 270.

Figure 6C:
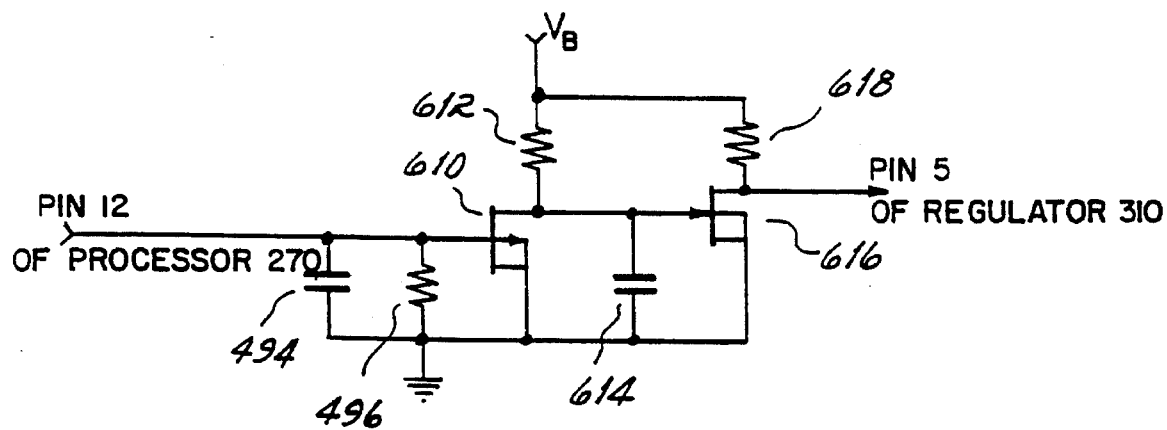

The component values selected herein may vary depending upon the size and type of housing 27 as well as the physical layout of the components within housing 27. Thus, as certain components are located close to probes 58, the high voltage signals therefrom may necessitate modification to the circuity or component values above described. For example, and with reference to FIGS. 6A and 6B, drivers for speaker 340 and low-battery LED 350 may be useful. To this end, resistor 348 may be dispensed with and pin 11 of processor 270 and the L-contact of switch 342 coupled to ground by a 1 Mohm resistor 600 and to the gate of transistor 602. LED 350 is coupled in series with 150 Ohm resistor 604 between $V_c$ and the source of transistor 602, the drain of which is grounded. Similarly, for speaker 340, pin 13 of processor 270 is coupled to ground through a 1 megohm resistor 606 and to the gate of transistor 608. Speaker 340 is coupled between $V_c$ and the source of transistor 608, the drain of which is also grounded. Power circuit 400 is modified as shown in FIG. 6C. In this case, the shut-down signal from pin 12 of processor 270 is coupled directly to the RC circuit of capacitor 494 and 496 and to the gate of transistor 610, the drain of which is grounded and the source of which is coupled to the battery voltage ($V_B$) via 1 megohm resistor 612. The source of transistor 610 is further coupled to ground via 1 µF capacitor 614 and to the gate of second transistor 616, the drain of which is grounded and the source of which is coupled to $V_B$ through 2.2 megohm resistor 618 and to pin 5 of regulator 310. Processor 270 is programmed to output a digital high "shut-down" signal when regulator 310 is to turn off instead of a digital low signal as previously described for power circuit 400 of FIG. 6.

Figure 7:
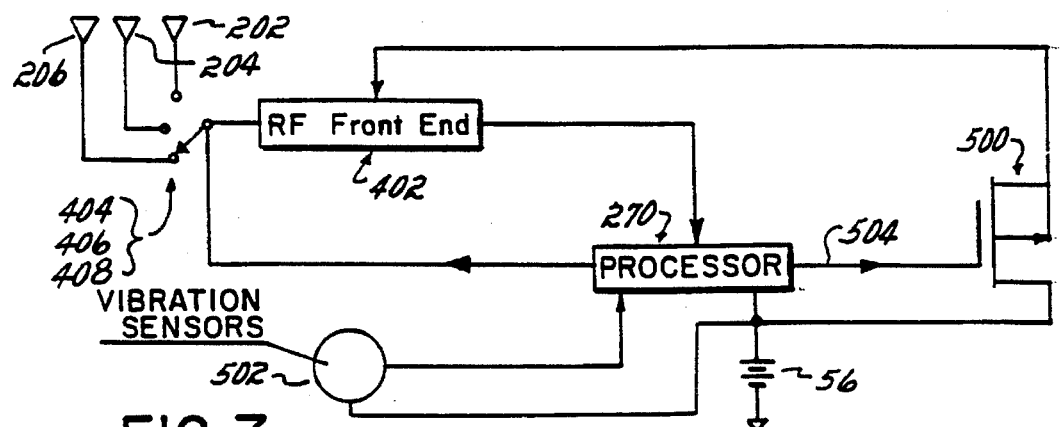
FIG. 7 is a block diagram of the receiver of FIG. 6 modified for use with vibration or motion sensors to further conserve battery power.

As shown in FIG. 7, receiver 200A may be modified to be responsive to a motion sensor-based battery power conservation technique. To this end, processor 270 is normally powered on at all times and controls the state of MOSFET switch 500 to selectively power-up RF front end 402. Processor 270 monitors for signals from one or more fluid-filled and perpendicularly oriented vibration sensors 502 which indicate that pet 18 is moving. If there is movement as indicated by a signal from sensors 502, processor 270 will output an "on" signal over line 504 to close switch 500 and turn RF front end 402 on. Signals from RF front end 402 are then examined, or interrogated, for a period of time, as previously described for up to 4 seconds, and if no proper code-detect signals, for example, are detected during that time, then processor 270 will terminate the "on" signal causing switch 500 to open and turn RF front end 402 off. If, however, such signals are detected, processor 270 will initiate the audible and shock annoyance signals as appropriate. The above sequence is activated every time there is a signal from sensors 502.

Processor 270 could alternatively be programmed to automatically turn RF front end 402 on at selected intervals which vary in accordance with the amount of movement of pet 18. Thus, for example, if pet 18 is very active, signals will be provided at a great rate from sensors 502. In that case, RF front end 402 may be turned full on until the rate of signals from sensors 502 begins to abate. If the activity level is only moderate, RF front end will be turned on every 0.5 seconds whereas if there is only slight motion, RF front end will be turned on only every second or so. Moreover, if the activity is so slight that there has been no motion for at least one minute, RF front end will be interrogated only every 15 seconds. Of course, whenever RF front end 402 is on, signals therefrom will be interrogated and, if appropriate, annoyance signals will be administered to cause pet 18 to move away from wire 20. If the pet remains idle for up to thirty minutes, no further interrogation of RF front end will occur until there is further movement by pet 18. Since many pets spend a great deal of time resting or sleeping, the motion sensors may reduce the amount of time the RF front end is on to about 10% of the time.

Figure 8:
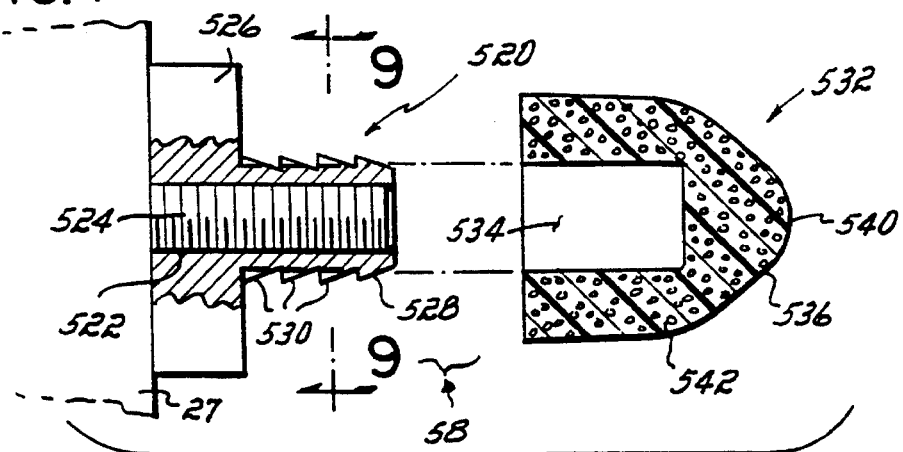
FIG. 8 is a cross-sectional, exploded view of the housing for the receivers of FIGS. 2, 3, and 5–7 showing the use of less-irritating conductive tips to communicate a shock to the pet.
Figure 9:
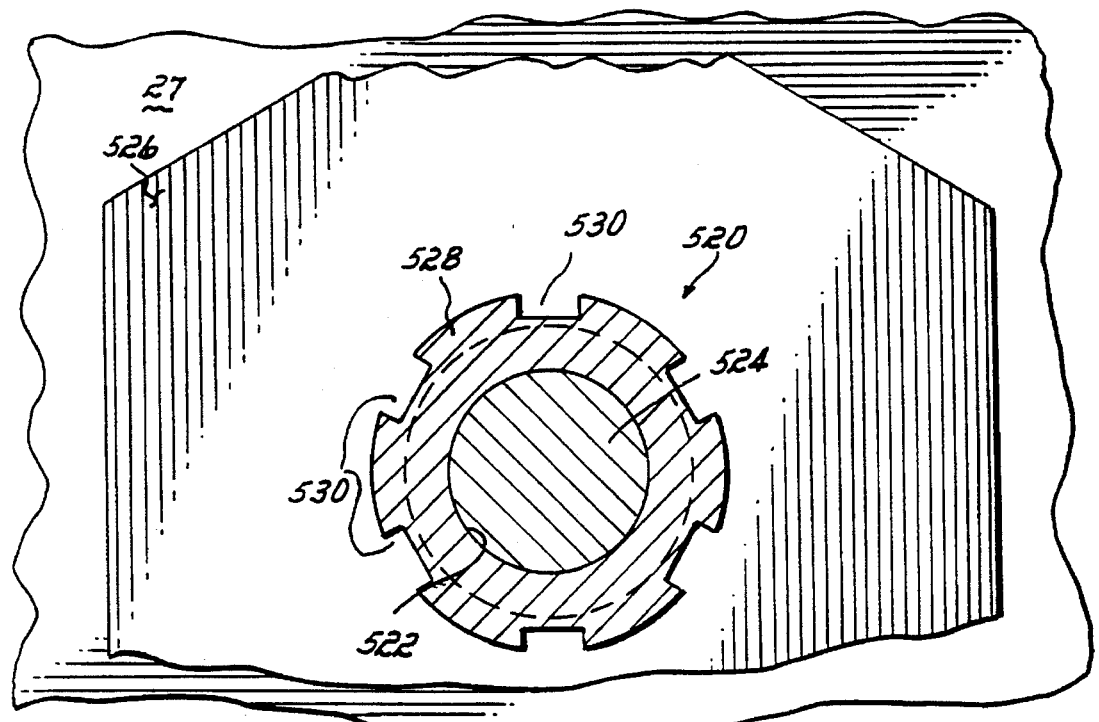
FIG. 9 is a cross-sectional view of the housing taken along line 9–9 of FIG. 8.

It will be appreciated that shocks are communicated to the neck of pet 18 by shock transfer probes 58 extending from housing 27 slung on the neck of pet 18. Housing 27 may be 1¼" H by 1⅝" W by 2", and probes 58 may be extended metal lugs extending from housing 27 as is conventional. As shown in FIGS. 8 and 9, probes 58 may alternatively be made of softer material so as to reduce abrasion of the pet's neck. To this end, two metal posts 520 (only one shown) are provided extending from housing 27. Posts 520 have a central threaded bore 522 to be threadably received on threaded lug 524 mounted to housing 27 in electrical communication with shock circuit 55 or shock transformer 372. Posts 520 each have a base portion 526 and a support portion 528, the latter having a "Christmas tree" like exterior with vertical, anti-rotation notches 530 extending along the periphery thereof. A conductive plastic tip 532 has a central aperture 534 sized to be snugly received over the support portion 528 to thus secure tip 532 to support 520. Tips 532 may be injection molded material having a hardness of 70 durometer, such as Part No. 2899X53675F from RTP Co. in Winona, Minn. Tips 532 are formed to have a shaped end 536 which is about 0.14 or 0.15 inches thick (measured from the central aperture 534 to the very terminus 540 of tip shaped end 536). The sidewall 542 of shaped end 536 is slanted at an angle of about 45° relative the longitudinal axis of tip 532.

Tips 532 provide a softer and more compliant surface against the neck of pet 18 than conventional metal lugs employed to communicate the shock to the pet. The tips 532 thus serve to protect pet 18 and make use of the systems of the present invention more readily accepted by owners (not shown). To accommodate pets of various sizes, posts 520 may be of different lengths. To this end, the support 528 is about 0.22 inches in length and base 526 is of such size that posts 520 extend from housing 27 a total of about 0.34 to 0.60 inches. The desired spacing correlates to the size of pet 18 on which receiver 26 will be used.

In use, area 16 is defined by the placement of wire 20 in the area to contain pet 18, and wire 20 connected to transmitter 22 (or 22A). The receiver, such as receiver 26, 26A, 200 or 200A, is mounted to a collar 28 and placed securely around the neck of pet 18 with probes 58 facing against the neck. As pet 18 moves about the bounded area, if the pet should move towards boundary 20, an RF signal will be detected and evaluated for the proper "code". If detection is confirmed, an audible annoyance signal and a shock annoyance signal will be given (or a shock administered after a delay depending upon the setting of switch 74 or 342) to cause pet 18 to back away from the boundary line.

By virtue of the foregoing, there is thus provided an electronic animal confinement system, and receiver and transmitter components therefor, which overcome various drawbacks associated with prior art confinement systems.

While the present invention has been illustrated by description of several embodiments and while the illustrative embodiments have been described in considerable detail, it is not the intention of applicants to restrict or in any way limit the scope of the appended claims to such detail. Additional advantages and modifications will readily appear to those skilled in the art. For example, multiple switches to provide independently selectable shock levels and delays may be provided. Similarly, other techniques of duty cycling the RF front end and/or processor may be provided. Also, where motion sensors are used, the frequency of interrogation may also be made to depend not only on motion activity, but also on the setting of the delay or shock level switch as desired. Still further, although described in connection with a pet, such as a dog, it will be appreciated that the present invention is equally applicable with any domesticatable animal. The invention in its broader aspects is therefore not limited to the specific details, representative apparatus and methods, and illustrative examples shown and described. For example, although three orthogonally positioned or oriented antennas are desirable, many of the features are applicable to systems wherein the receiver has one or two antennas. Accordingly, departures may be made from such details without departing from the spirit or scope of applicants' general inventive concept.

Appendix A

Electronic Animal Confinement System

```
:100000002D000400ED02010A00082E00100C2D0046
:100010000400ED02080AEE02060A0008140C3A0079
:10002000740045065440A020C0009FA02110AFB0288
:10003000210A9F0C0600A605050C0509A6040A0C5A
:100040003B00BF0C060061000C0C02000400C6045B
:100050000300A0C3B0000081C055507320A010C7E
:100060003900008060C390000081C05010C390095
:10007000A90A400033007800C605BF0C06008306BD
:1000800029091C047F00550C3E007400E607EB0AAA
:1000900065070E0A540A1C04E605550C3E00F702DB
:1000A000590A65070E0AE00A0400050C0200040C58
:1000B0003700690068006A003F04050C2B00060C3D
:1000C0002C002D0C3D000502040E290071000400D7
:1000D0000502040E4304890143077200AB102FD02BE
:1000E000670A9F0A0502040E290008078F0A2807DD
:1000F000910A0B020304910003070930A11020304FF
:10010008C0003079301A406A20A4304030C8A0016
:100110004306A10AAA020101C31006800670A080051B
:10012000660A2805670A43040A024307EA003F07F4
:100130009C0A14046A008B0A3F056A008B0A1404A7
:1001400040B0A14050A0C2D002507350A0400ED02A0
:1001500A40A1F06BB0A0400370C06006605060247
:10016000660435004000C26002F0C06001C072C09E5
:10017000F902BD0AC10AE605540A140C0509E60590
:10018000540A040C2E00B506CF0A860500000000B4
:1001900000008604410C0009EE02C50AD60A860555
:1001A0000000008604410C0009EE02CF0A6100010C38
:1001B0003900050C0509E605FE02540A1F05540A1C
:1001C000FE0C050005040000C60500000000C60482
:1001D00000000000E40A0000000000000400000002D
:0A01E0000000E606390A0000EB0AF1
:0203FE00390ABA
:00000001FF
```

What is claimed is:

1. A receiver adapted to be supported on an animal to confine the animal behind a boundary defined by a boundary signal, the receiver comprising:

three generally orthogonally positioned antennas;

a source of annoyance signals;

receiver circuitry coupled to the source of annoyance signals and enabling the annoyance signals in response to receipt of a boundary signal on at least one of the antennas; and, passive analog switch circuitry electrically coupled to the antennas and electrically sequentially coupling one of the three antennas to the receiver circuitry at a time.

2. The receiver of claim 1 wherein the receiver circuitry includes control circuitry coupled to the switch circuitry by which to control which antenna is coupled to the receiver circuitry.

3. The receiver of claim 2 wherein the switch circuitry includes a trio of switches each coupled to a respective one of the antennas.

4. The receiver of claim 3 wherein the control circuitry includes counter circuitry having a plurality of outputs each coupled to a respective one of the switches whereby to control same.

5. The receiver of claim 3 wherein the control circuitry includes a programmable device which selectively actuates a respective one of the switches whereby to control same.

6. The receiver of claim 2 wherein the control circuit includes means for maintaining a selected one of the antennas coupled to the receiver circuitry in response to receipt of a boundary signal.

7. The receiver of claim 1 wherein the source of annoyance signals includes an audible sounder whereby to provide an audible alert.

8. The receiver of claim 1 wherein the source of annoyance signals includes a shock generator whereby to generate a shock.

9. The receiver of claim 8 further including at least one electrically conductive probe coupled to the shock generator whereby to communicate the shock from the shock generator to the animal.

10. The receiver of claim 9 wherein the probe includes an electrically conductive, compliant tip.

11. The receiver of claim 8 wherein the receiver circuitry includes duration-monitoring circuitry enabling the shock generator when a boundary signal has been received for a selected duration.

12. The receiver of claim 11 wherein the receiver circuitry further includes a selector by which to select the duration.

13. The receiver of claim 11 wherein the receiver circuitry includes code-detecting circuitry evaluating the received boundary signal for a predetermined code, the duration-monitoring circuitry and the code-detecting circuitry cooperating to enable the shock generator when a boundary signal with the predetermined code has been received for the selected duration.

14. The receiver of claim 13 wherein the source of annoyance signals further includes an audible sounder responsive to the code-detecting circuitry to sound when a boundary signal with the predetermined code is received.

15. The receiver of claim 13 in combination with a transmitter of the boundary signal, the transmitter having circuitry for including the predetermined code with the boundary signal.

16. The receiver of claim 8 wherein the receiver circuitry includes code-detecting circuitry evaluating the received boundary signal for a predetermined code, the duration-monitoring circuitry and the code-detecting circuitry cooperating to enable the shock generator when a boundary signal with the predetermined code is received.

17. The receiver of claim 16 wherein the source of annoyance signals further includes an audible sounder responsive to the code-detecting circuitry to sound when a boundary signal with the predetermined code is received.

18. The receiver of claim 16 in combination with a transmitter of the boundary signal, the transmitter having circuitry for including the predetermined code with the boundary signal.

19. The receiver of claim 8 wherein the receiver circuitry includes signal-strength circuitry enabling the shock generator when a boundary signal of sufficient strength is received.

20. The receiver of claim 19 wherein the receiver circuitry further includes code-detecting circuitry evaluating the received boundary signal for a predetermined code, the signal-strength circuitry and the code-detecting circuitry cooperating to enable the shock generator when a sufficiently strong boundary signal with the predetermined code is received.

21. The receiver of claim 20 wherein the source of annoyance signals further includes an audible sounder responsive to the code-detecting circuitry to sound when a boundary signal with the predetermined code is received.

22. The receiver of claim 20 in combination with a transmitter of the boundary signal, the transmitter having circuitry for including the predetermined code with the boundary signal.

23. The receiver of claim 1 wherein the receiver circuitry includes an RF front end and a processing section, the RF front end converting the signals received by the antennas to a form compatible with the processing section, the processing section being responsive to the converted form of signals to enable the annoyance signals, the receiver further comprising duty cycle circuitry coupled to the RF front end and selectively coupling power between a source of power and the RF front end to turn same on and off whereby to conserve power.

24. The receiver of claim 23 wherein the processing section includes control circuitry coupled to the duty cycle circuitry and responsive to receipt by one of the antennas of a signal that may be a boundary signal to interrupt action of the duty cycle circuitry whereby to maintain the RF front end turned on.

25. The receiver of claim 23 wherein the receiver further includes motion sensor circuitry responsive to motion of the animal to interrupt action of the duty cycle circuitry whereby to maintain the RF front end turned on.

26. The receiver of claim 23 wherein the receiver further includes motion sensor circuitry responsive to prolonged inactivity of the animal to limit action of the duty cycle circuit whereby to maintain the RF front end turned off.

27. The receiver of claim 23 wherein the duty cycle circuitry is further coupled to the processing section and further selectively couples power between the source of power and the processing section to selectively turn same on and off whereby to conserve power.

28. A receiver adapted to be supported on an animal to confine the animal behind a boundary defined by a boundary signal, the receiver comprising:

at least one antenna;

a shock generator;

receiver circuitry coupled to the antenna, the receiver circuitry including duration-monitoring circuitry enabling the shock generator in response to receiving a boundary signal for a selected duration, the receiver circuitry further including a selector by which to adjust the duration.

29. The receiver of claim 28 wherein the receiver circuitry further includes code-detecting circuitry evaluating the received boundary signal for a predetermined code, the duration-monitoring circuitry and the code-detecting circuitry cooperating to enable the shock generator when a boundary signal with the predetermined code has been received for the selected duration.

30. The receiver of claim 29 further comprising an audible sounder responsive to the code-detecting circuitry to sound when a boundary signal with the predetermined code is received.

31. The receiver of claim 29 in combination with a transmitter of the boundary signal, the transmitter having circuitry for including the predetermined code with the boundary signal.

32. The receiver of claim 28 wherein the receiver circuitry further includes signal-strength circuitry enabling the shock generator when a boundary signal of sufficient strength is received.

33. The receiver of claim 32 wherein the receiver circuitry further includes code-detecting circuitry comparing a code in the received boundary signal to a predetermined code, the signal-strength circuitry and the code-detecting circuitry cooperating to enable the shock generator when a sufficiently strong boundary signal with the predetermined code is received.

34. The receiver of claim 33 further comprising an audible sounder responsive to the code-detecting circuitry to sound when a boundary signal with the predetermined code is received.

35. The receiver of claim 33 in combination with a transmitter of the boundary signal, the transmitter having circuitry for including the predetermined code with the boundary signal.

36. The receiver of claim 28 wherein the receiver circuitry includes an RF front end and a processing section including the duration-monitoring circuitry, the RF front end converting the signals received by the antenna to a form compatible with the processing section, the processing section being responsive to the converted form of signals to control the shock generator, the receiver further comprising duty cycle circuitry coupled to the RF front end and selectively coupling power between a source of power and the RF front end to turn same on and off whereby to conserve power.

37. The receiver of claim 36 wherein the processing section includes control circuitry coupled to the duty cycle circuitry and responsive to receipt of a signal that may be a boundary signal to interrupt action of the duty cycle circuitry whereby to maintain the RF front end turned on.

38. The receiver of claim 36 wherein the receiver further includes motion sensor circuitry responsive to motion of the animal to interrupt action of the duty cycle circuitry whereby to maintain the RF front end turned on.

39. The receiver of claim 36 wherein the receiver further includes motion sensor circuitry responsive to prolonged inactivity of the animal to limit action of the duty cycle circuit whereby to maintain the RF front end turned off.

40. The receiver of claim 36 wherein the duty cycle circuitry is further coupled to the processing section and further selectively couples power between the source of power and the processing section to selectively turn same on and off whereby to conserve power.

41. The receiver of claim 28 further including at least one electrically conductive probe coupled to the shock generator whereby to communicate shocks from the shock generator to the animal.

42. The receiver of claim 41 wherein the probe includes an electrically conductive, compliant tip.

43. A receiver adapted to be supported on an animal to confine the animal behind a boundary defined by a boundary signal, the receiver comprising:
at least one antenna;
a source of annoyance signals;
an RF front end coupled to the antenna and processing circuitry coupled to the RF front end and enabling the annoyance signals in response to receipt of a boundary signal on the antenna; and
duty cycle circuitry coupled between a source of power and at least the RF front end, the duty cycle circuitry selectively coupling power between the source of power and the RF front end to turn same on and off whereby to conserve power.

44. The receiver of claim 43 further comprising:
two more antennas, the three antennas being generally orthogonally positioned; and
switch circuitry coupled to the antennas and selectively coupling, one at a time, one of the antennas to the RF front end whereby to enable the annoyance signals in response to receipt of a boundary signal on at least one of the antennas.

45. The receiver of claim 43 wherein the processing section further includes control circuitry coupled to the duty cycle circuitry and responsive to receipt of a signal that may be a boundary signal to interrupt action of the duty cycle circuitry whereby to maintain the RF front end turned on.

46. The receiver of claim 45 wherein the receiver further includes motion sensor circuitry responsive to motion of the animal to interrupt action of the duty cycle circuitry whereby to maintain the RF front end turned on.

47. The receiver of claim 45 wherein the receiver further includes motion sensor circuitry responsive to prolonged inactivity of the animal to limit action of the duty cycle circuit whereby to maintain the RF front end turned off.

48. The receiver of claim 43 wherein the duty cycle circuitry is further coupled to the processing section and further selectively couples power between the source of power and the processing section to selectively turn same on and off whereby to conserve power.

49. The receiver of claim 48 wherein the receiver further includes motion sensor circuitry responsive to motion of the animal to interrupt action of the duty cycle circuitry whereby to maintain the RF front end and the processing circuitry turned on.

50. The receiver of claim 48 wherein the receiver further includes motion sensor circuitry responsive to prolonged inactivity of the animal to limit action of the duty cycle circuit whereby to maintain the RF front end and the processing circuitry turned off.

51. The receiver of claim 43 wherein the duty cycle circuitry includes a multivibrator with an output cycling between a first state and a second state, the output being coupled to the RF front end such that in a first state of the output, the RF front end is turned on, and in a second state of the output, the RF front end is turned off.

52. The receiver of claim 51 further comprising state-controller circuitry responsive to the RF front end to control the multivibrator such that its output remains in the first state in response to receipt of a signal that may be a boundary signal.

53. The receiver of claim 52 wherein the processing circuitry includes reset circuitry to release control of the multivibrator from the state-controller circuitry whereby the multivibrator's output again cycles between the first and second states.

54. The receiver of claim 43 further comprising:
power-signal circuitry having a first state and a second state and being coupled to the processing circuitry whereby to power same in the first state, the power-signal circuitry normally being in the second state; and
control circuitry, coupled to the duty-cycle circuitry and the power-signal circuitry, responsive to receipt of a signal that may be a boundary signal to interrupt action of the duty-cycle circuitry and to force the power-signal circuitry into the first state whereby to maintain the RF front end and the processing section turned on.

55. The receiver of claim 54 wherein the processing section includes reset circuitry to release control of the duty-cycle circuitry and power-signal circuitry from the control circuitry whereby to turn off the processing section and to restore action of the duty-cycle circuitry to turn the RF front end on and off.

56. The receiver of claim 55 wherein the processing section further includes keep-alive circuitry coupled to the power-signal circuitry and selectively causing the power-signal circuitry to remain in the first state whereby to keep the processing section turned on irrespective of the reset circuitry.

57. The receiver of claim 43 wherein the duty-cycle circuitry includes:

actuatable timer circuitry having an output being in one of a first state and a second state; and power-signal circuitry responsive to the timer circuitry output to provide power to the RF front end in the first state of the timer circuitry and to terminate power to the Rf front end in the second state of the timer circuitry.

58. The receiver of claim 57, the processing circuitry further being coupled to the power-signal circuitry to be turned on thereby in the first state of the timer circuitry.

59. The receiver of claim 58, the processing circuitry including shutdown circuitry, the timer circuitry being responsive to the shutdown circuitry such that the output of the timer circuitry is actuated into the second state in response to a shutdown signal from the shutdown circuitry, whereby the processing circuitry is turned off and the timer circuitry reestablishes its output in the first state after a timer period of the timer circuitry.

60. The receiver of claim 57, the processing circuitry including shutdown circuitry, the timer circuitry being responsive to the shutdown circuitry such that the output of the timer circuitry is actuated into the second state in response to a shutdown signal from the shutdown circuitry, whereby the RF front end is turned off and the timer circuitry reestablishes its output in the first state after a timer period of the timer circuitry.

61. The receiver of claim 43 wherein the source of annoyance signals includes a shock generator whereby to generate a shock.

62. The receiver of claim 61 further including at least one electrically conductive probe coupled to the shock generator whereby to communicate the shock from the shock generator to the animal.

63. The receiver of claim 62 wherein the probe includes an electrically conductive, compliant tip.

64. The receiver of claim 61 wherein the receiver circuitry includes duration-monitoring circuitry enabling the shock generator when a boundary signal has been received for a selected duration.

65. The receiver of claim 64 wherein the receiver circuitry further includes a selector by which to select the duration.

66. The receiver of claim 64 wherein the receiver circuitry includes code-detecting circuitry evaluating the received boundary signal for a predetermined code, the duration-monitoring circuitry and the code-detecting circuitry cooperating to enable the shock generator when a boundary signal with the predetermined code has been received for the selected duration.

67. The receiver of claim 66 wherein the source of annoyance signals further includes an audible sounder responsive to the code-detecting circuitry to sound when a boundary signal with the predetermined code is received.

68. The receiver of claim 66 in combination with a transmitter of the boundary signal, the transmitter having circuitry for including the predetermined code with the boundary signal.

69. The receiver of claim 61 wherein the receiver circuitry includes code-detecting circuitry evaluating the received boundary signal for a predetermined code, the duration-monitoring circuitry and the code-detecting circuitry cooperating to enable the shock generator when a boundary signal with the predetermined code is received.

70. The receiver of claim 69 wherein the source of annoyance signals further includes an audible sounder responsive to the code-detecting circuitry to sound when a boundary signal with the predetermined code is received.

71. The receiver of claim 69 in combination with a transmitter of the boundary signal, the transmitter having circuitry for including the predetermined code with the boundary signal.

72. The receiver of claim 61 wherein the receiver circuitry includes signal-strength circuitry enabling the shock generator when a boundary signal of sufficient strength is received.

73. The receiver of claim 72 wherein the receiver circuitry further includes code-detecting circuitry evaluating the received boundary signal for a predetermined code, the signal-strength circuitry and the code-detecting circuitry cooperating to enable the shock generator when a sufficiently strong boundary signal with the predetermined code is received.

74. The receiver of claim 72 wherein the source of annoyance signals further includes an audible sounder responsive to the code-detecting circuitry to sound when a boundary signal with the predetermined code is received.

75. The receiver of claim 72 in combination with a transmitter of the boundary signal, the transmitter having circuitry for including the predetermined code with the boundary signal.

76. A receiver adapted to be supported on an animal to confine the animal behind a boundary defined by a boundary signal, the receiver comprising:

at least one antenna;

an audible sounder;

a shock generator;

receiver circuitry coupled to the antenna, the receiver circuitry including code-detecting circuitry enabling the audible sounder in response to a predetermined code in a boundary signal received at the antenna, the receiver circuitry further including duration-monitoring circuitry responsive to the code-detect circuitry and receipt at the antenna of the boundary signal for a selected duration, the shock generator being responsive to the duration-monitoring circuitry so as to generate a shock when the boundary signal includes the predetermined code and is received for the selected duration; and the receiver circuitry further including signal-strength circuitry responsive to the code-detect circuitry and receipt at the antenna of the boundary signal having a strength above a preselected level, the shock generator further being responsive to the signal-strength circuitry so as to generate a shock when the boundary signal is of sufficient strength and includes the predetermined code irrespective of whether the boundary signal is received for the selected duration.

77. The receiver of claim 76 further comprising a selector by which to select the duration.

78. A receiver adapted to be supported on an animal to confine the animal behind a boundary defined by a boundary signal, the receiver comprising:
- at least one antenna;
- a shock generator;
- receiver circuitry coupled to the antenna and enabling the shock generator in response to receipt of a boundary signal;
- a conductive probe coupled to the shock generator whereby to communicate a shock from the shock generator to the animal; and
- an electrically conductive, compliant portion being defined at a distal tip of the probe.

79. The receiver of claim 78 wherein the probe includes a rigid support portion and the compliant tip portion is a separate piece having an aperture into which the support portion is received to establish mechanical and electrical connection therebetween.

80. The receiver of claim 79, the support portion having a christmas-tree-like exterior.

81. The receiver of claim 79, the support portion having anti-rotation notches formed therein.

* * * * *